June 12, 1962 R. HETHERINGTON 3,038,610
DEIONIZATION UNIT WITH AUTOMATIC SHUTOFF OPERABLE UPON
EXHAUSTION OF RESIN'S ION EXCHANGE CAPACITY
Filed Jan. 30, 1959 2 Sheets-Sheet 1
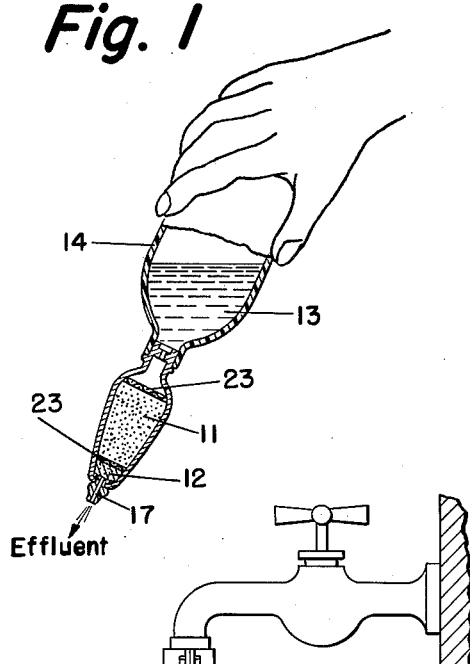
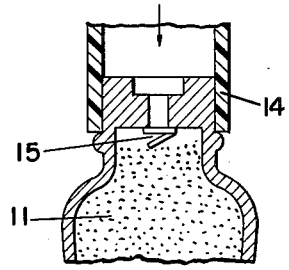
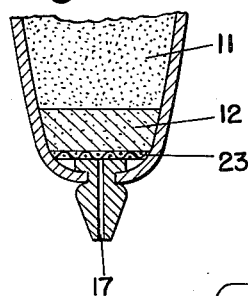
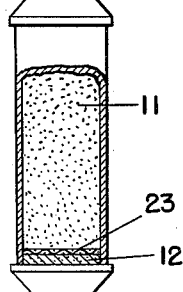
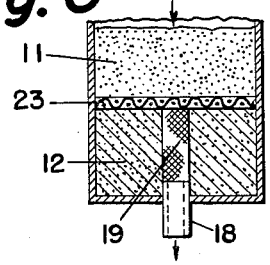
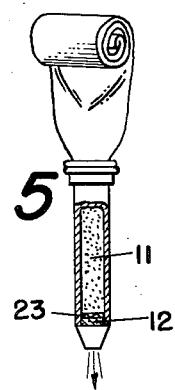
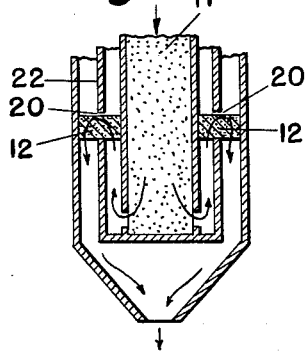
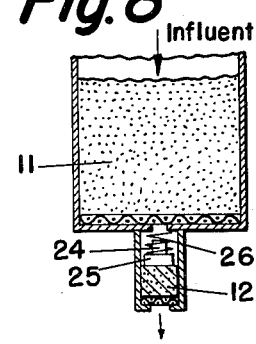

United States Patent Office 3,038,610
Patented June 12, 1962

3,038,610
DEIONIZATION UNIT WITH AUTOMATIC SHUT-OFF OPERABLE UPON EXHAUSTION OF RESIN'S ION EXCHANGE CAPACITY
Richard Hetherington, Philadelphia, Pa., assignor to Rohm & Haas Company, Philadelphia, Pa., a corporation of Delaware
Filed Jan. 30, 1959, Ser. No. 790,251
8 Claims. (Cl. 210—96)

This invention relates to liquid-treating apparatus for deionizing water by means of ion-exchange materials. The term "deionizing," as used throughout the specification, will be understood to encompass the removal of ions of various types, including the minerals commonly found in water. It has particular reference to portable, hand-operated devices for treating water in comparatively small volumes. However, it is also satisfactorily applicable to larger pieces of apparatus, such as those employed for deionizing water being circulated or otherwise used throughout the home or, on a larger commercial scale, in hotels, factories, and the like.

The deionization of water by means of ion-exchange resins and other ion-exchanging substances has long been well known to the art. Similarly well known has been the use of columns of ion-exchange materials for such purposes, the impure or mineral-laden water generally being admitted as an influent at the top and, after passing through the column in contact with the ion-exchangers, comes out as a deionized effluent at the bottom. Examples of such devices are to be found in U.S. Patents No. 2,680,714, No. 2,755,246, and No. 2,852,464. Also quite familiar are the cartridge-type of ion-exchange "columns," which are especially useful in small or portable liquid-treating apparatus. Examples of such devices are to be found in U.S. Patent No. 2,761,833, British Patent No. 493,539, and French Patent No. 479,062.

With all of the prior art devices, there has always been the problem of determining when the ion-exchangers have been substantially used up, as it is normally important not to continue using the deionizing equipment when its entire capacity for deionization has been depleted for all practical purposes. One way in which this has been done involves running frequent or continuous analyses on the effluents obtained, usually to determine the electrical resistivity and thereby ascertain whether the ion-exchangers are still functioning efficiently. An example of this method is to be found in U.S. Patent No. 2,760,152. Another way is to incorporate an indicating dye in the ion-exchanger, a dye which is capable of indicating by change of color when the ion-exchangers are exhausted and will no longer function to remove impurities from water. An example of this method is to be found in U.S. Patent No. 2,761,833.

While such methods have met with some success, there has been general dissatisfaction with them, particularly in the case of the small, portable units which normally are operated by nontechnically trained persons, and/or people who have little or no time to keep an eye out for color changes or to run analytical tests. A particularly troublesome feature of the use of dyes as indicators is the fact that the dyes are not very stable. Most of them are photosensitive and tend to fade, as a result of which they are not very reliable indicators. What has been needed, therefore, is a relatively foolproof, essentially automatic method and apparatus for preventing the further use of a deionizing apparatus when its capacity is gone. That is, a means whereby the flow of liquid through the apparatus is blocked and, for all practical purposes, shut off when the deionizing ability of the ion exchangers is exhausted.

The present invention fulfills the just-described need, and does so with a device which is positive-acting, very efficient, simple to make and use, and extremely low in cost. In essence, the invention consists of the use of a relatively high-swelling ion-exchange material which, upon a change in the pH of the liquid passing in contact therewith, swells to block either the influent opening, the effluent opening, or both. Alternatively, instead of the swollen ion-exchange material doing the actual blocking, it can, by its act of swelling, urge another material, such as a piston, a plug, a valve door, or the like, into a position where the material thus urged will do the actual blocking. The exact modes of operation, and some devices which are illustrative of the numerous ways in which the invention may be practiced, will be understood from the following description and upon reference to the drawings in which:

FIG. 1 is a view in perspective, partially sectioned, of a small, portable, hand-operated water deionizer, showing the general construction of the device and the manner in which liquid housed in a squeeze-type bottle is purified and ejected as a stream;

FIG. 2 is an enlarged sectional showing of the rear or influent end of the ion-exchanger cartridge portion of the FIG. 1 apparatus;

FIG. 3 is an enlarged sectional showing of the forward or effluent end of the ion-exchanger cartridge portion of the FIG. 1 apparatus;

FIG. 4 is another form of apparatus, partly in section, embodying the principles of the present invention, in this case the device being adapted to deionize water as it issues from a tap or spigot;

FIG. 5 is still another form of apparatus, partly in section, which can readily make use of the invention, in this instance the liquid to be deionized being contained in a collapsible tube or bag-like reservoir;

FIG. 6 is a diagrammatic representation of another modification of the invention in which a multi-perforated tube is employed for conveying the effluent out of the apparatus, and the swellable ion exchange is arranged to close off the multi-perforations;

FIG. 7 is a diagrammatic representation of another modification of the invention in which the liquid being treated is conveyed in an indirect path to its point of exit from the apparatus, a band or plug of the swellable ion exchanger being located at one or more points in the path of the liquid so as to block its progress upon being caused to swell and fill the passageway;

Figure 9:
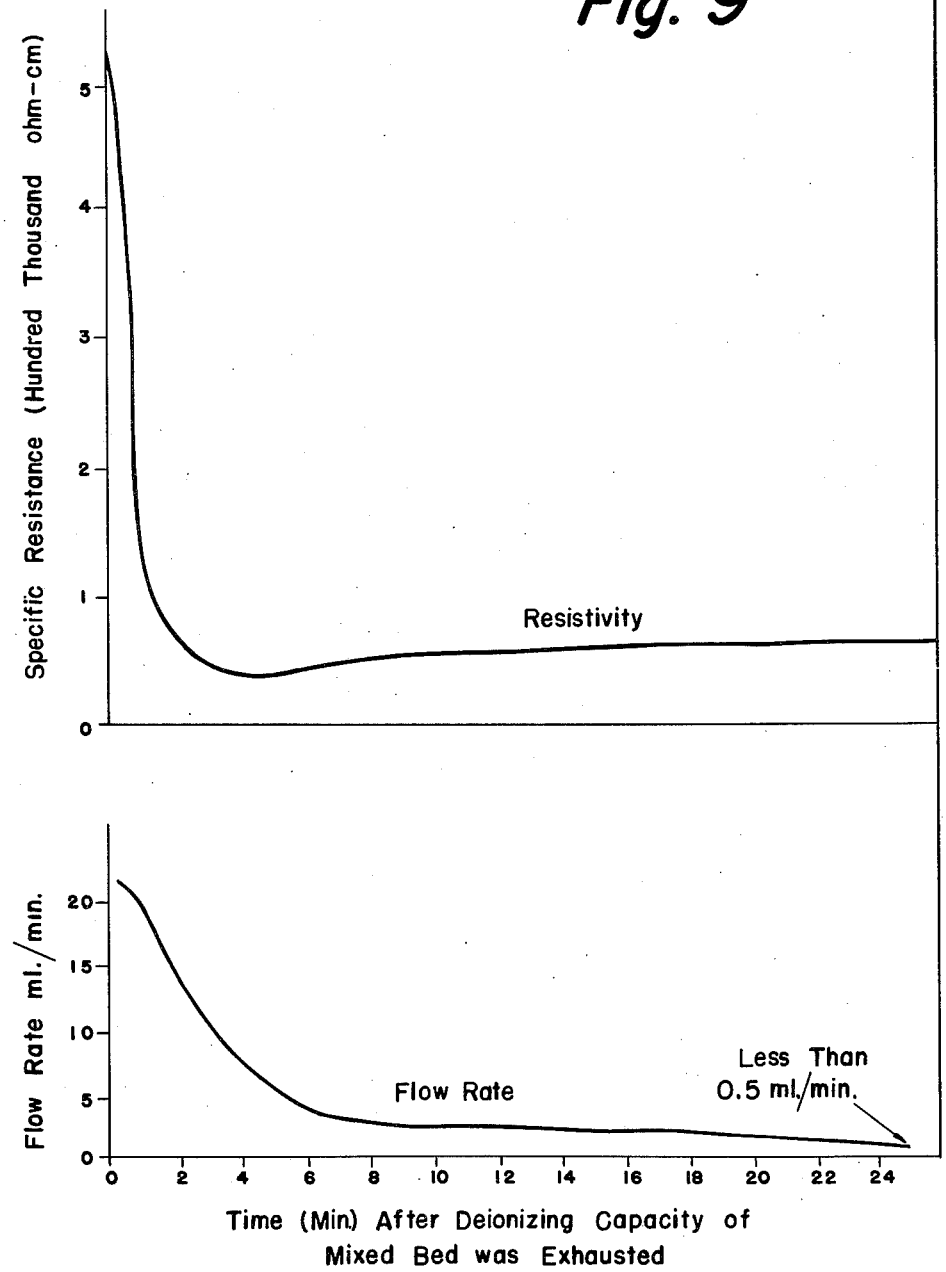

FIG. 8 is a diagrammatic showing of still another modification of the invention, in this construction featuring the use of a plug or valve to close an opening at the effluent end of the apparatus, the closure being moved by the expansion of a swellable ion-exchange material; and FIG. 9 is a graph showing how the specific resistance of a liquid being treated with a mixed bed of ion-exchange resins, and the flow rate of the liquid through the bed, are coincidentally slowed quite rapidly as a result of the loss of ion-exchange capacity of the resins in the bed.

Referring to the drawings, in which similar parts are given the same reference numerals, all of the various modifications shown have as their principal active components: (a) either a mixture of an anion-exchange and a cation-exchange material (as illustrated at 11), or two separate but contiguous beds of such materials (not shown); and (b) a high-swelling ion exchanger which can be activated to cut off or cut down the flow of liquid through the apparatus.

Some of the general requirements are as follows. The mixed bed 11 of cation and anion exchangers must be of such composition that upon exhaustion of its demineralizing capacity it will "bleed" either acid or base; i.e., the liquid being treated will have an acidic or basic pH as it exits from the mixed resin bed. This can be done by using a sufficient excess of either the anion or the cation exchanger. If an excess of the anion exchanger is used, the effluent will become alkaline after the mixed bed is exhausted. (By "excess" is meant excess of ion exchange capacity, it being well known that the factors which control that capacity are the amounts and strength of the ion exchange resins.) In this case, the swellable ion exchanger 12 should be a cation-exchange material whose volume will increase when going from the hydrogen to the salt form (e.g., sodium or calcium). This would preferably be a carboxylic material with a low degree of crosslinking. An example of such a material is Amberlite IRC–50, an ion-exchange resin which is well known to those skilled in the art. Other ion exchangers could be used, even clay, e.g., electro-dialyzed bentonite, since it is in the hydrogen form.

If the mixed bed of resins 11 has an excess of cation-exchange material, then the swellable ion exchanger 12 should be a low cross-linked, anion-exchange material which will swell when going from the free base form to the salt form. An example of such an ion exchanger is the resinous reaction product of a halomethylated copolymer of a monovinyl aromatic hydrocarbon with a divinyl hydrocarbon, and a primary amine such as diethylene triamine, as described in U.S. Patent No. 2,591,574. Other low crosslinked resins which are suited for this purpose are the products obtained by reacting crosslinked copolymers of an ester having the formula $CH_2=CRCOOR'$ and divinyl benzene with a polyamine containing at least one primary amino group, such as dimethylaminopropylamine or diethylenetriamine, as described in U.S. Patent No. 2,675,359.

Whichever ion-exchange resin is in excess in the mixed bed, the final effluent which is obtained from the apparatus would have a pH of approximately 7. The appropriate swellable ion-exchange material 12 would scavenge the acidic or basic components present in the effluent from the mixed bed resins when the deionizing capacity thereof has been exhausted. This scavenging action of the swellable ion-exchange material, plus its automatic shutoff action, which is described below, gives complete assurance that only a high quality, demineralized water is obtained from the apparatus.

The mode of employing the major operative principle of the invention can be varied in many ways, all without departing from the scope thereof. The swellable ion-exchange material could be located in the proximity of any orifice which it is desired to close off to prevent further passage of liquid therethrough. In such applications, only small bands, layers, or plugs are needed as shown at 12 in the drawings. The ion exchanger could be in the form of resinous beads, granules, fibers, rods, sheets, etc., all in suitable form, making up the layer, band or plug. Another modification could be to have the high-swelling ion-exchange material in fiber form actually woven into a screen having a mesh of such dimensions that, while serving to prevent loss of the resins in the mixed bed 11 by covering the exit opening, permits passage of the liquid therethrough. Still other forms are possible; e.g., a rod of the ion exchange could be milled or cast with polyethylene into sheet material, or as a perforated disc, or other geometrical shapes. The actual physical form of the ion exchanger, or the use thereof with respect to an aperture to be closed by the swelling of the ion-exchange material, can obviously be varied to suit practically any design of liquid purification apparatus which operates through the use of ion-exchange materials.

The arrangements of the devices in the drawings illustrate only a few of the above-mentioned and other available modes of application of the invention. In the squeeze bottle design of FIGS. 1—2—3, which may generally follow the arrangement described in more precise detail in U.S. Patent No. 2,761,833, the liquid 13 being treated is forced down through the column of mixed resins 11, through the high swelling resin 12, and out of the apparatus as shown. When the deionizing resins 11 are exhausted, the one which originally was present in excess—i.e., $H^+$ (cationic) or $OH^-$ (anionic) form—gives the succeeding effluent portion a corresponding $H^+$ or $OH^-$ characteristic. The particular resin 12 (which was selected for use in the apparatus because of its tendency to swell in the presence of $H^+$ ions or in the presence of $OH^-$ ions, as the case may be), immediately reacts and swells many times its original volume. For example, weakly acidic carboxylic type resins in the $H^+$ form are known to swell about 75 percent of their original volume when contacted by the NaOH that forms from a mixed bed having an excess of the anion exchanger in the $OH^-$ condition. This swelling can effectively block further liquid from passing through the column, either by causing the compacted resins 11 to move in the direction of the squeeze bottle 14, thereby urging valve 15 to close, or by filling in tightly against the exit aperture 17.

The same general methods of operation apply to the devices of FIGS. 4 and 5 as to the apparatus of FIGS. 1–3. The variations illustratively are as follows. In FIG. 4 the device is shown secured to a faucet for use in deionizing tap water, although, of course, it need not be attached to the source of water nor need it be limited to use with a tap outlet. In FIG. 5, the device is shown with a bag or deformable tube as the casing for holding the liquid to be treated in lieu of the FIG. 1 squeeze bottle.

The FIG. 6 apparatus employs a tubular member 18, having numerous perforations 19, the treated liquid being forced to course therethrough as it exits from the device. When the high swelling resin 12 expands, it effectively fills or blocks perforations 19 so as to cut down or even stop the flow of the liquid out of tube 18.

The FIG. 7 arrangement provides for a ring or plug of the high swelling ion exchanger 12 which almost fills one or more openings 20 extending through the walls of a cylinder 22. When the ion exchanger is caused to swell, it also fills or blocks openings 20 so as to diminish or stop the flow of the liquid which has passed through the mixed resin bed 11 and is being coursed through and out the bottom of cylinder 22.

In FIG. 8, there is illustrated a mixed bed ion-exchange column 11. An opening 24 is provided at the bottom of the column to enable the treated liquor to exit therefrom. A plug or valve 25 is axially movable, under appropriate pressure, into opening 24. Serving to keep the valve in its normally open position is a spring 26 which is stressed against the underside 27 of the column. Beneath plug 25 is a quantity of the high swelling ion exchanger 12; when this is caused to swell, the expansion of the ion exchanger causes the plug 12 to move into opening 24, thereby retarding or even blocking the opening against passage of liquid therethrough.

Optionally, as shown in each of the different forms of apparatus depicted by the various figures, there may be employed a sieve-like filter of porcelain, a wire-like material, or any other inert substance which will let liquid through but which can act as a restraining member 23 to prevent the resins from washing out of the bottom of the column. The swellable resin 12 can be made to close off the openings in member 23, if desired, and thus stop the liquid flow through the apparatus.

As stated above, it is preferred to practice the invention by utilizing mixed bed resins 11 to accomplish the deionization of the liquids being treated. The cationic exchanger can be of the well-known strongly acidic type, e.g., the sulfonic acid resins, or the equally well-known weakly acidic type, e.g., the carboxylic acid resins. The anionic exchanger can be of the well-known quaternary ammonium type, one that is capable of splitting neutral salts. Examples of such mixed beds can be found in U.S. Patents No. 2,578,937 and No. 2,578,938. The cationic exchangers are preferably in the hydrogen form, and the anionic exchangers are preferably in the hydroxide form, at the outset. If desired, more than one type of cationic, and more than one type of anionic exchanger can be incorporated in the mixed beds (e.g., a strong and a weak base exchanger can be mixed with a strong and a weak acid exchanger).

Alternatively, it may be desired to utilize a non-mixed, multi-bed system of exchangers. Typically, the anion exchanger is situated in a column below the cation exchanger or vice versa. Two, four, six, eight or more beds can be employed, alternating the two different types of exchangers. These non-mixed beds are satisfactory for many uses, particularly for removing such substances as sodium bicarbonate or calcium chloride from aqueous solutions, but is of limited value when used to remove sodium chloride or sodium sulfate. In the latter case, there is a leakage of cations through the anionic bed. This converts the hydroxide ions in the anionic resin to caustic much before the normal capacity of the anionic exchanger would otherwise become exhausted.

Whether the mixed bed or the non-mixed, multi-bed system is used, it is important that the high swelling resin be of a type which will not swell appreciably when contacted by the treated liquid; i.e., liquid which has been deionized upon passage through the mixed or multi-beds of ion exchangers but which will swell considerably when the liquid passing through the exchangers can, in effect, no longer be deionized. This is the point when the exchange bed starts to bleed either acid or base, as described above.

The graph in FIG. 9 illustratively depicts the effectiveness of the invention. The data therein were obtained by employing an apparatus similar to that shown in FIG. 8 except that no valve or plug 24 was utilized. Instead, the amount of the high-swelling ion-exchange material 12 was increased so as to fill the space which the plug would normally have occupied. Commercially well-known ion-exchange resins were used at 11 to demineralize tap water being treated thereby, namely, Amberlite IR–120 (H) and a slight excess (i.e., a slightly more than equal amount) of Amberlite IRA–400 (OH).

The mixed bed, whose use is represented in FIG. 9, produced a deionized water of 525,000 ohm-cm. When the bed's capacity for deionization was exhausted, the succeeding effluent was alkaline due to the fact that the bed had an excess of the anion exchanger in OH⁻ form. This effluent, upon contacting the high-swelling ion exchanger 12, caused a major diminution of liquid flow in a few minutes, and practically a complete stoppage within the next 15 or 20 minutes. With the aid of a mechanical valve, etc., this stoppage time could have been accelerated, if desired. As a practical matter, however, it is generally not preferred in most applications (such as in units for deionization water used in steam irons, or in pharmacies, etc.) to abruptly stop the flow. By slowly bringing the flow to a halt, the user gets sufficient notice so as more conveniently to arrange for regeneration or replacement of the ion exchanger 11. It will be noted, from FIG. 9, that the specific resistance of the effluent dropped rapidly at about the same time that the flow thereof was being rapidly slowed down. This correlation of the two curves in the graph shows how effectively the effluent slowing or stopping coincides with the lessening of the purity of the demineralized liquid; i.e., with the reduction of the ion-exchanging capacity of the mixed bed.

As will be clear from the various alternative modes of application of the present invention described above, numerous departures can be made from the specific embodiments herein described by way of illustration, and all without departing from the spirit and scope of the invention. Accordingly, it will be understood that this invention encompasses all modifications and equivalents which come within the purview of the following claims.

I claim:

1. In an ion-exchange system provided with apparatus having means including at least one opening for enabling a liquid which is purified by said system to exit as an effluent therefrom, the combination of: two ion exchangers, one a cation and the other an anion exchanger, with both of which the liquid is caused to come into contact, the amounts and strengths of the exchangers being such that the ion exchange capacity of one of them is greater than the other, whereby if the hydrogen ion exchange capacity of the cation exchanger is the greater the effluent stream will be acidic but if the hydroxyl ion exchange capacity of the anion exchanger is the greater the effluent stream will be alkaline; and a high swelling third ion exchanger which quickly expands only when contacted by a liquid having the same pH as that of said effluent stream from said first two exchangers after the ion exchange capacity of one but not of both of said first two exchangers has been exhausted, the swellable ion exchanger being located adjacent to at least one exit opening for the effluent where it is able upon expansion to fill at least a portion of that opening and thereby reduce the rate of flow of the liquid therethrough.

2. The system of claim 1 additionally including in the combination a valve means for controllably limiting the rate of liquid flow through the exit opening in the apparatus upon being activated so as to close a portion of said opening, the swellable third ion exchanger being located adjacent said valve means so that when caused to swell by the change in pH of the effluent stream said third ion exchanger applies a thrust against said valve means and thereby activates it as aforesaid.

3. The ion-exchange system of claim 1 in which the high-swelling third ion-exchange is a cation-exchanger in the hydrogen ion form, said exchanger being relatively inactive so long as non-alkaline liquids are placed in contact therewith but quickly swelling when contacted by an alkaline liquid.

4. The ion-exchange system of claim 1 in which the high-swelling third ion-exchange material is an anion-exchanger in the hydroxyl ion form, said exchanger being relatively inactive so long as non-acidic liquids are placed in contact therewith but quickly swelling when contacted by an acidic liquid.

5. The ion-exchange system of claim 2 in which the high-swelling third ion-exchange material is a cation exchanger in the hydrogen ion form, said exchanger being relatively inactive so long as non-alkaline liquids are placed in contact therewith but quickly swelling when contacted by an alkaline liquid.

6. The ion-exchange system of claim 2 in which the high-swelling third ion-exchange material is an anion-exchanger in the hydroxyl ion form, said exchanger being relatively inactive so long as non-acidic liquids are placed in contact therewith but quickly swelling when contacted by an acidic liquid.

7. In an apparatus for deionizing a liquid by bringing it into contact with at least one anion and one cation exchanger: the combination of an excess of one of the deionizing ion exchangers with respect to the other whereby, after the deionizing capacity of said exchangers has become substantially exhausted, the succeeding effluents therefrom will consist essentially of the ions supplied by the excess exchanger; a high swelling ion-exchange material which is not affected by the deionized effluent from the said anion and cation exchangers but which, because of its pH, quickly swells when contacted by ions in the effluent that are supplied by the excess exchanger, said ions having a pH which is on the opposite half of the pH scale from that of said high-swelling ion-exchange material; and means including at least one opening in said apparatus for enabling the treated liquid to exit as an effluent therefrom; the said high swelling ion-exchange material being located adjacent to at least one said opening from said liquid exiting means whereby, upon being swollen, the high-swelling ion-exchange material expands to fill at least a portion of the opening adjacent thereto and thereby reduce the rate of flow of liquid therethrough.

8. The deionizing apparatus of claim 7 additionally including valve means intermediate the opening and the high-swelling ion-exchange material for controllably limiting the rate of flow of the purified liquid through the opening upon being actuated so as to close at least a portion of the opening, the expansion of the high swelling ion-exchange material serving to apply a thrust against said valve means and thereby actuate it as aforesaid.

References Cited in the file of this patent

UNITED STATES PATENTS

| | | |
|---|---|---|
| 2,761,833 | Ward | Sept. 4, 1956 |
| 2,781,312 | Klumb et al. | Feb. 12, 1957 |
| 2,810,692 | Calmon | Oct. 22, 1957 |
| 2,842,152 | Winter et al. | July 8, 1958 |